(12) United States Patent
Jin et al.

(10) Patent No.: US 12,074,738 B2
(45) Date of Patent: Aug. 27, 2024

(54) SEMICONDUCTOR DEVICE

(71) Applicant: Samsung Electronics Co., Ltd., Suwon-si (KR)

(72) Inventors: Jahoon Jin, Hwaseong-si (KR); Kyunghwan Min, Hwaseong-si (KR); Soomin Lee, Hwaseong-si (KR); Sang-Ho Kim, Suwon-si (KR); Jihoon Lim, Suwon-si (KR); Sodam Ju, Hwaseong-si (KR); Hyun Su Chea, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 56 days.

(21) Appl. No.: 17/951,482

(22) Filed: Sep. 23, 2022

(65) Prior Publication Data
US 2023/0171134 A1 Jun. 1, 2023

(30) Foreign Application Priority Data

Nov. 26, 2021 (KR) .................. 10-2021-0165139
Mar. 4, 2022 (KR) .................. 10-2022-0027922

(51) Int. Cl.
| | |
|---|---|
| H04L 25/03 | (2006.01) |
| H04B 1/16 | (2006.01) |
| H04L 1/20 | (2006.01) |
| H04L 7/00 | (2006.01) |

(52) U.S. Cl.
CPC ......... *H04L 25/03878* (2013.01); *H04B 1/16* (2013.01); *H04L 1/205* (2013.01); *H04L 7/0079* (2013.01)

(58) Field of Classification Search
CPC . H04L 25/03878; H04L 1/205; H04L 7/0079; H04L 25/4917; H04B 1/16; G06F 1/06
See application file for complete search history.

(56) References Cited

U.S. PATENT DOCUMENTS

| | | | | |
|---|---|---|---|---|
| 5,880,615 | A * | 3/1999 | Bazes | ............. H03K 5/082 |
| | | | | 327/307 |
| 8,576,903 | B2 | 11/2013 | Raphaeli et al. | |
| 8,750,406 | B2 | 6/2014 | Pan et al. | |
| 9,007,108 | B1 * | 4/2015 | Waltari | ............. H03M 1/12 |
| | | | | 327/158 |

(Continued)

OTHER PUBLICATIONS

Machine translation of JP-4774543-B2. (Year: 2011).*

*Primary Examiner* — Jean B Corrielus
(74) *Attorney, Agent, or Firm* — Harness, Dickey & Pierce, P.L.C.

(57) ABSTRACT

A semiconductor device including a comparison circuit configured to receive an input signal having n signal levels, where n is a natural number equal to or greater than three, and output n−1 first signals having two signal levels. The device includes a jitter compensation circuit configured to receive the n−1 first signals and compensate for at least one of a length of a period in which a signal level of at least one of the n−1 first signals transitions from a first signal level to a second signal level different from the first signal level, and a length of a period in which the signal level of the at least one of the n−1 first signals transitions from the second signal level to the first signal level, to output n−1 second signals.

20 Claims, 8 Drawing Sheets

(56) References Cited

U.S. PATENT DOCUMENTS

| | | | |
|---|---|---|---|
| 9,184,906 B1 | 11/2015 | Min et al. | |
| 9,338,040 B2 | 5/2016 | Longo et al. | |
| 9,979,571 B2 | 5/2018 | Wang | |
| 10,020,967 B1 | 7/2018 | Li et al. | |
| 10,809,297 B2 | 10/2020 | Lee et al. | |
| 11,146,378 B2 * | 10/2021 | Kim | H04L 7/0079 |
| 2010/0194204 A1 * | 8/2010 | Kaiwa | H03K 19/0005 |
| | | | 307/99 |
| 2014/0070859 A1 * | 3/2014 | Waltari | H03L 7/091 |
| | | | 327/158 |
| 2019/0363914 A1 * | 11/2019 | Hayashi | H04L 7/0041 |
| 2021/0311120 A1 | 10/2021 | Guo et al. | |
| 2021/0336761 A1 | 10/2021 | Smith et al. | |

* cited by examiner

| DH3 | DM3 | DL3 | MSB(OS) | LSB(OS) |
|-----|-----|-----|---------|---------|
| 1   | 1   | 1   | 1       | 1       |
| 0   | 1   | 1   | 1       | 0       |
| 0   | 0   | 1   | 0       | 1       |
| 0   | 0   | 0   | 0       | 0       |

SEMICONDUCTOR DEVICE

This application claims priority from Korean Patent Application No. 10-2021-0165139 filed on Nov. 26, 2021 and Korean Patent Application No. 10-2022-0027922 filed on Mar. 4, 2022 in the Korean Intellectual Property Office, the disclosures of which are incorporated herein by reference in their entirety.

FIELD

The present inventive concepts relate to a semiconductor device.

BACKGROUND

As the operating speed of semiconductor devices gradually increases, an increase in the speed of communication between the devices is desired or required. For the increased communication speed between the devices, communication using a multi-level signal having three or more signal levels is used.

A receiver receiving such a multi-level signal has a reduced timing margin in order to determine a voltage level of the multi-level signal. Therefore, research for adjusting such a timing margin in a communication environment using the multi-level signal is being conducted.

SUMMARY

An aspect of the present inventive concepts provides a semiconductor device that outputs an output signal having an improved timing margin.

Aspects of the present inventive concepts are not limited to the aspects mentioned above, and other technical aspects not mentioned above will be clearly understood by those skilled in the art from the following description.

According to an aspect of the present inventive concepts, a semiconductor device including a comparison circuit configured to receive an input signal having n signal levels, where n is a natural number equal to or greater than three, and output n−1 first signals having two signal levels. The device includes a jitter compensation circuit configured to receive the n−1 first signals and compensate for at least one of a length of a period in which a signal level of at least one of the n−1 first signals transitions from a first signal level to a second signal level different from the first signal level, and a length of a period in which the signal level of the at least one of the n−1 first signals transitions from the second signal level to the first signal level, to output n−1 second signals.

According to an aspect of the present inventive concepts, a semiconductor device includes a comparison circuit configured to receive an input signal having n signal levels, where n is a natural number equal to or greater than three, and output n−1 first signals having two signal levels, and a jitter compensation circuit configured to receive the n−1 first signals and compensate for at least one of a length of a period in which a signal level of at least one of the n−1 first signals is a first signal level, and a length of a period in which the signal level of the at least one of the n−1 first signals is a second signal level different from the first signal level, to output n−1 second signals. The device includes a skew compensation circuit configured to receive the n−1 second signals and compensate for a timing skew between the n−1 second signals to output n−1 third signals.

According to an aspect of the present inventive concepts, a semiconductor device includes a comparison circuit configured to receive an input signal having n signal levels, where n is a natural number equal to or greater than three, and output first to n−1th comparison signals having two signal levels, and a jitter compensation circuit configured to compensate for at least one of a length of a period in which a signal level of at least one of the first to n−1th comparison signals transitions from a first signal level to a second signal level different from the first signal level, and a length of a period in which the signal level of the at least one of the first to n−1th comparison signals transitions from the second signal level to the first signal level, to output first to n−1th jitter compensation signals. The device includes a skew compensation circuit configured to compensate for a timing skew between the first to n−1th jitter compensation signals to output first to n−1th skew compensation signals, and a decoder configured to convert the first to n−1th skew compensation signals into an output signal.

BRIEF DESCRIPTION OF THE DRAWINGS

The above and other aspects and features of the present inventive concepts will become more apparent by describing in detail example embodiments thereof with reference to the attached drawings, in which.

DETAILED DESCRIPTION OF SOME EXAMPLE EMBODIMENTS

Figure 1:
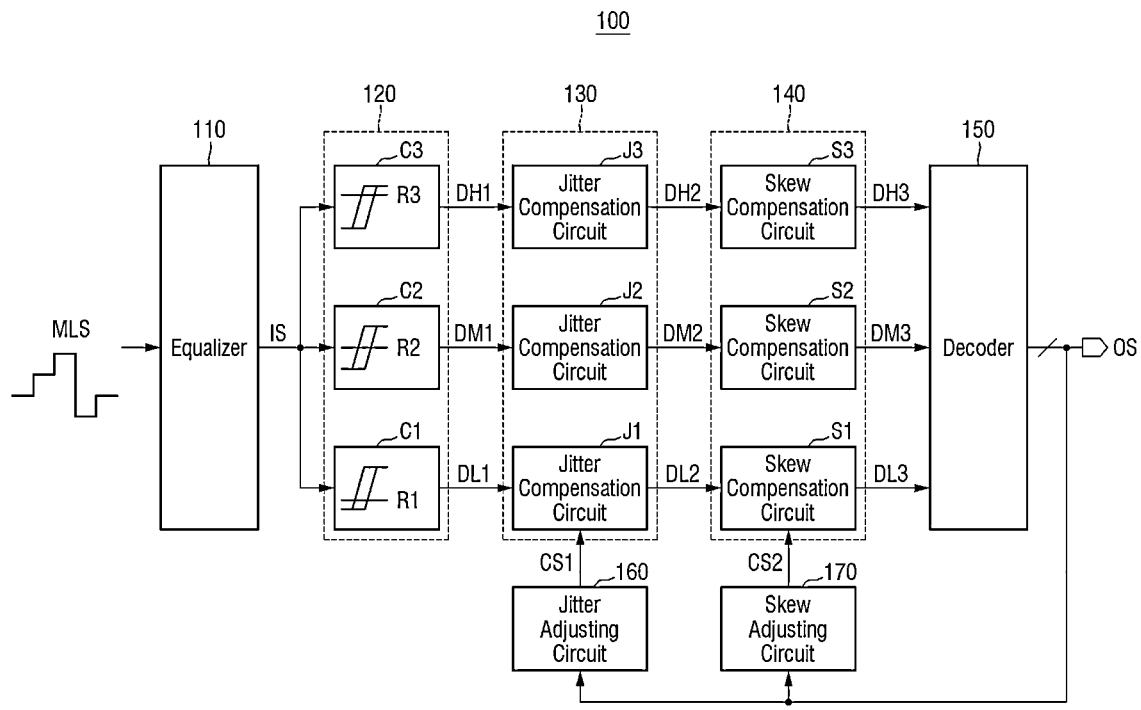
FIG. 1 is a view for describing a semiconductor device according to some example embodiments.
Figure 2:
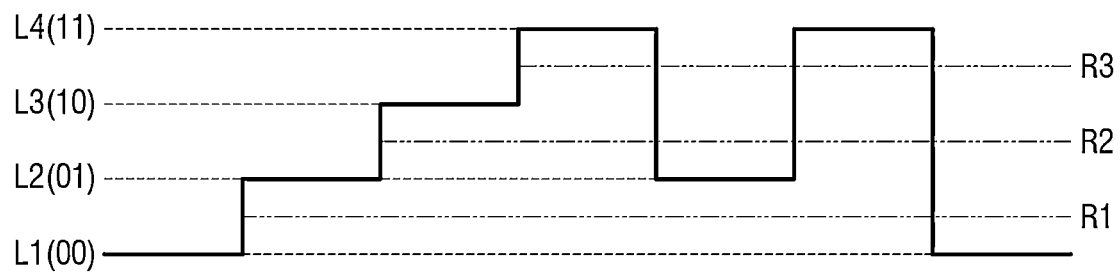
FIG. 2 is a view for describing an input signal of FIG. 1.

FIG. 1 is a view for describing a semiconductor device according to some example embodiments. FIG. 2 is a view for describing an input signal of FIG. 1.

Referring to FIG. 1, a semiconductor device 100 according to some example embodiments may include an equalizer 110, a comparison circuit 120, a jitter compensation circuit 130, a skew compensation circuit 140, and a decoder 150.

The semiconductor device 100 according to some example embodiments may be, for example, a receiver coupled to a specific device to receive and process a signal, or a receiving module including the receiver. However, example embodiments according to the present inventive concepts are not limited thereto.

The semiconductor device 100 may receive a multi-level signal MLS having n (n is a natural number equal to or greater than 3) signal levels. For example, the semiconductor device 100 may receive a multi-level signal MLS having four signal levels, five signal levels, etc. A description of the multi-level signal MLS may be replaced with a description of an input signal IS.

The equalizer 110 may compensate for the channel loss of the multi-level signal MLS to output the input signal IS. The equalizer 110 may adjust a signal level of the received multi-level signal MLS in order to compensate for the channel loss. The equalizer 110 may remove or suppress noise, jitter, etc. caused by a channel and compensate for the channel loss to increase a size of an eye-opening.

The comparison circuit 120 may receive an input signal IS having n signal levels and convert the received input signal IS having n signal levels into a plurality of first signals DL1, DM1, and DH1 having two signal levels. The comparison circuit 120 may compare the input signal IS with a plurality of reference signals R1, R2, and R3 to output the plurality of first signals DL1, DM1, and DH1.

Specifically, referring to FIG. 2, the input signal IS may have, for example, four signal levels. The input signal IS may have a first signal level L1, a second signal level L2, a third signal level L3, and a fourth signal level L4. The first signal level L1 may correspond to a first logical value [00], the second signal level L2 may correspond to a second logical value [01], the third signal level L3 may correspond to a third logical value [10], and the fourth signal level L4 may correspond to a fourth logical value [11].

A magnitude of each of the plurality of reference signals R1, R2, and R3 may have a value between the signal levels L1, L2, L3, and L4 of the input signal IS. For example, the magnitude of each of the reference signals R1, R2, and R3 may have an intermediate value between the signal levels L1, L2, L3, and L4 of the input signal IS. Specifically, a magnitude of a first reference signal R1 may have a value between the first signal level L1 and the second signal level L2, a magnitude of a second reference signal R2 may have a value between the second signal level L2 and the third signal level L3, and a magnitude of a third reference signal R3 may have a value between the third signal level L3 and the fourth signal level L4.

Referring again to FIG. 1, the comparison circuit 120 may include first to third comparators C1, C2, and C3. The first comparator C1 may output a first-first signal DL1 by comparing the input signal IS with the first reference signal R1, the second comparator C2 may output a first-second signal DM1 by comparing the input signal IS with the second reference signal R2, and the third comparator C3 may output a first-third signal DH1 by comparing the input signal IS with the third reference signal R3.

For example, the first comparator C1 may output '0' when the input signal IS is smaller than the first reference signal R1, and the first-first signal DL1 may have a logic low (L) value. The first comparator C1 may output '1' when the input signal IS is greater than the first reference signal R1, and the first-first signal DL1 may have a logic high (H) value. The fact that the first-first signal DL1 has a logic low (L) value or '0' is merely an example for convenience of description, and a form of a value of the first-first signal DL1 may be deformed according to an example embodiment. For example, when the input signal IS is smaller than the first reference signal R1, the first-first signal DL1 may have a logic high (H) value or '1'.

Similarly, the second comparator C2 may output '0' when the input signal IS is smaller than the second reference signal R2, and the first-second signal DM1 may be '0'. The second comparator C2 may output 1 when the input signal IS is greater than the second reference signal R2, and the first-second signal DM1 may be '1'. The third comparator C3 may output '0' when the input signal IS is smaller than the third reference signal R3, and the first-third signal DH1 may be '0'. The third comparator C3 may output '1' when the input signal IS is greater than the third reference signal R3, and the first-third signal DH1 may be '1'.

The jitter compensation circuit 130 may receive the plurality of first signals DL1, DM1, and DH1 and compensate for jitter between the plurality of first signals DL1, DM1, and DH1 according to a first control signal CS1 to output a plurality of second signals DL2, DM2, DH2. For example, the jitter compensation circuit 130 may compensate for a length of a period in which at least one of the plurality of first signals DL1, DM1, and DH1 transitions from logic high to logic low or transitions from logic low to logic high to output the plurality of second signals DL2, DM2, and DH2.

The jitter compensation circuit 130 may include first to third jitter compensation circuits J1, J2, and J3. According to the first control signal CS1, the first jitter compensation circuit J1 may compensate for a length of a period in which the first-first signal DL1 transitions from logic high to logic low or transitions from logic low to logic high to output a second-first signal DL2 or to output the first-first signal DL1 as the second-first signal DL2. According to the first control signal CS1, the second jitter compensation circuit J2 may compensate for a length of a period in which the first-second signal DM1 transitions from logic high to logic low or transitions from logic low to logic high to output a second-second signal DM2 or to output the first-second signal DM1 as the second-second signal DM2. According to the first control signal CS1, the third jitter compensation circuit J3 may compensate for a length of a period in which the first-third signal DH1 transitions from logic high to logic low or transitions from logic low to logic high to output a second-third signal DH2 or to output the first-third signal DH1 as the second-third signal DH2.

Each of the first to third jitter compensation circuits J1, J2, and J3 may include, for example, a duty cycle corrector (DCC). The DCC may increase a pull-down current to increase a speed that the first signals DL1, DM1, and DH1 transition from logic high to logic low or decrease the pull-down current to decrease the speed that the first signals DL1, DM1, and DH1 transition from logic high to logic low. The DCC may increase a pull-up current to increase a speed that the first signals DL1, DM1, and DH1 transition from logic low to logic high or decrease the pull-up current to decrease the speed that the first signals DL1, DM1, and DH1 transition from logic high to logic low.

The skew compensation circuit 140 may receive the plurality of second signals DL2, DM2, and DH2 and compensate for a timing skew between the plurality of second signals DL2, DM2, and DH2 according to a second control signal CS2 to output a plurality of third signals DL3, DM3, and DH3.

The skew compensation circuit 140 may include first to third skew compensation circuits S1, S2, and S3. The first skew compensation circuit S1 may receive the second-first signal DL2 and output a third-first signal DL3 according to the second control signal CS2. The second skew compensation circuit S2 may receive the second-second signal DM2 and output a third-second signal DM3 according to the second control signal CS2. The third skew compensation circuit S3 may receive the second-third signal DH2 and output a third-third signal DH3 according to the second control signal CS2.

Each of the first to third skew compensation circuits S1, S2, and S3 may include, for example, a delay cell.

The decoder 150 may convert the plurality of third signals DL3, DM3, and DH3 into an output signal OS. The output signal OS may be, for example, two bits.

A jitter adjusting circuit 160 may generate the first control signal CS1 that compensates for jitter between the first signals DL1, DM1, and DH1 based on the output signal OS. The jitter adjusting circuit 160 may provide the first control signal CS1 to the jitter compensation circuit 130.

In addition, the jitter adjusting circuit 160 may adjust a degree of compensation for jitter between the first signals DL1, DM1, and DH1 based on the output signal OS. The degree of compensation for jitter between the first signals DL1, DM1 and DH1 by the jitter compensation circuit 130 may vary according to the first control signal CS1.

For example, the jitter adjusting circuit 160 may generate the first control signal CS1 that adjusts a degree of change in length of a period in which the first signals DL1, DM1, and DH1 transition from logic high to logic low or transition from logic low to logic high. In other words, the jitter adjusting circuit 160 may generate the first control signal CS1 that adjusts a degree of change in length of a period in which the first signals DL1, DM1, and DH1 are logic high or logic low.

For example, when the first control signal CS1 has a first signal level, the length of the period in which the first signals DL1, DM1, and DH1 transition from logic high to logic low or transition from logic low to logic high may be changed by a first time. In other words, the length of the period in which the first signals DL1, DM1, and DH1 are logic high or logic low may be changed by the first time. When the first control signal CS1 has a second signal level, the length of the period in which the first signals DL1, DM1, and DH1 transition from logic high to logic low or transition from logic low to logic high may be changed by a second time different from the first time. In other words, the length of the period in which the first signals DL1, DM1, and DH1 are logic high or logic low may be changed by the second time.

A skew adjusting circuit 170 may compensate for a skew between the second signals DL2, DM2, and DH2 based on the output signal OS. The skew adjusting circuit 170 may generate the second control signal CS2 that compensates for a skew between the second signals DL2, DM2, and DH2 to provide the second control signal CS2 to the skew compensation circuit 140.

The jitter compensation circuit 130 and the skew compensation circuit 140 will be described in more detail with reference to FIGS. 3 to 6.

Figure 3:
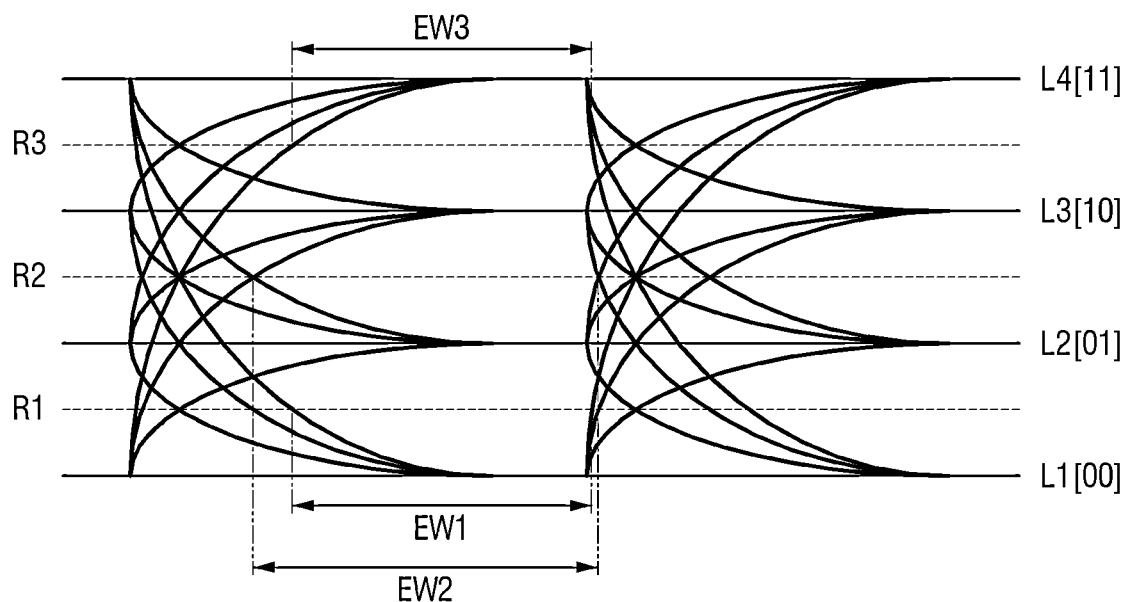
FIG. 3 is a view illustrating an eye-diagram of the input signal.

FIG. 3 is a view illustrating an eye-diagram of an input signal.

Referring to FIG. 3, a shape of a waveform in which the input signal IS transitions from one signal level to the other signal level varies depending on the one signal level or the other signal level.

Accordingly, an eye width EW1 between the first signal level L1 and the second signal level L2, an eye width EW2 between the second signal level L2 and the third signal level L3, and an eye width EW3 between the third signal level L3 and the fourth signal level L4 may be different. For example, the eye width EW2 may be greater than the eye width EW1 or the eye width EW3.

Figure 4:
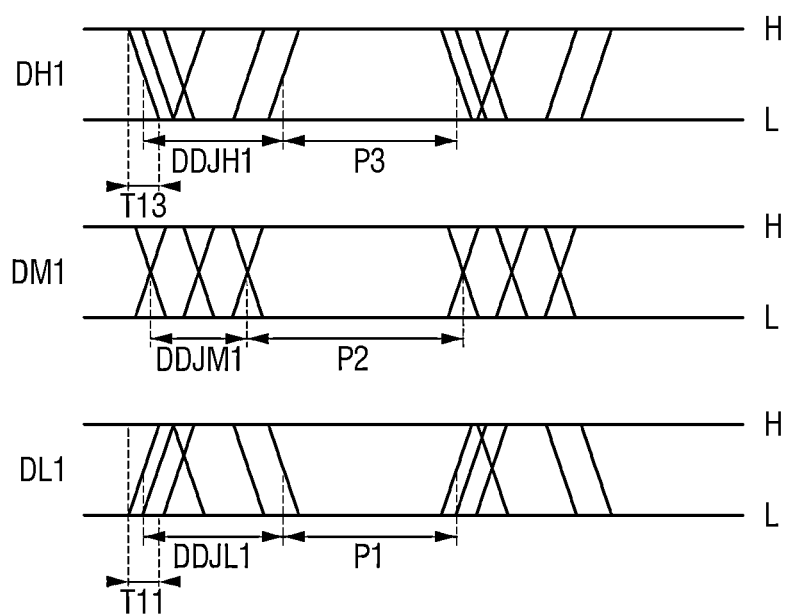
FIG. 4 is a timing diagram of a first signal of FIG. 1.

FIG. 4 is a timing diagram of a first signal of FIG. 1.

Referring to FIG. 4, a first-first data-dependent jitter DDJL1 is generated in the first-first signal DL1, a first-second data-dependent jitter DDJM1 is generated in the first-second signal DM1, and a first-third data-dependent jitter DDJH1 is generated in the first-third signal DH1. Accordingly, a length P1 of a period in which the first-first signal DL1 is logic low (L), a length P2 of a period in which the first-second signal DM1 is logic low (L) or logic high (H), and a length P3 of a period in which the first-third signal DH1 is logic high (H) are different from each other. That is, timing margins of the first-first signal DL1, the first-second signal DM1, and the first-third signal DH1 are different from each other.

Since the first-second signal DM1 is generated by comparison with the second reference signal R2 that is greater than the first reference signal R1 and smaller than the third reference signal R3, the first-first data-dependent jitter DDJL1 and the first-third data-dependent jitter DDJH1 may be greater than the first-second data-dependent jitter DDJM1.

Figure 5:
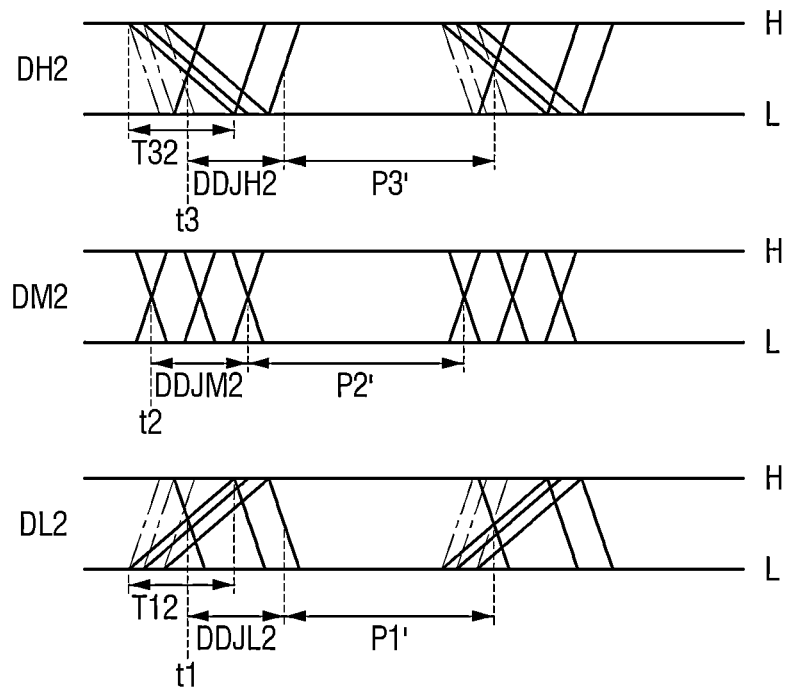
FIG. 5 is a timing diagram of a second signal of FIG. 1.

FIG. 5 is a timing diagram of a second signal of FIG. 1. In FIG. 5, a dashed line indicates signals of the first signals DL1, DM1, and DH1 of FIG. 4.

Referring to FIGS. 1, 4, and 5, the jitter compensation circuit 130 may change any one of the length of the period in which the first signals DL1, DM1, and DH1 transition from logic low (L) to logic high (H) and the length of the period in which the first signals DL1, DM1, and DH1 transition from logic high (H) to logic low (L) to compensate for the first-first to first-third data-dependent jitters DDJL1, DDJM1, and DDJH1.

In this case, the jitter compensation circuit 130 may compensate for, for example, the first-first to first-third data-dependent jitters DDJL1, DDJM1, and DDJH1 based on the smallest data-dependent jitter among the first-first to first-third data-dependent jitters DDJL1, DDJM1, and DDJH1. Therefore, the jitter compensation circuit 130 may compensate for the first-first data-dependent jitter DDJL1 and the first-third data-dependent jitter DDJH1 based on the first-second data-dependent jitter DDJM1. This is only an example, and example embodiments of the present inventive concepts are not limited thereto.

Specifically, the first jitter compensation circuit J1 may receive the first-first signal DL1 in which the length of the transition period from logic low (L) to logic high (H) is T11 to generate the second-first signal DL2 in which the length of the transition period from logic low (L) to logic high (H) is T12. T12 may be longer than T11. For example, the first jitter compensation circuit J1 may change a slope of the transition period from logic low (L) to logic high (H). Accordingly, a speed at which the second-first signal DL2 transitions from logic low (L) to logic high (H) may be slower than a speed at which the second-first signal DL2 transitions from logic high (H) to logic low (L). A length P1' of a period in which the second-first signal DL2 is logic low (L) may increase.

The second jitter compensation circuit J2 may output the first-second signal DM1 as the second-second signal DM2.

The third jitter compensation circuit J3 may receive the first-third signal DH1 in which the length of the transition period from logic high (H) to logic low (L) is T13 to generate the second-third signal DH2 in which the length of the transition period from logic high (H) to logic low (L) is T32. T32 may be longer than T13. For example, the third jitter compensation circuit J3 may change a slope of the transition period from logic high (H) to logic low (L). Accordingly, a speed at which the second-third signal DH2 transitions from logic low (L) to logic high (H) may be faster than a speed at which the second-third signal DH2 transitions from logic high (H) to logic low (L). A length P3' of a period in which the second-third signal DH2 is logic high (H) may increase.

For example, a second-first data-dependent jitter DDJL2, a second-second data-dependent jitter DDJM2, and a second-third data-dependent jitter DDJH2 may be the same. The length P1' of the period in which the second-first signal DL2 is logic low (L), a length P2' of a period in which the second-second signal DM2 is logic low (L) or logic high (H), and the length P3' of the period in which the second-third signal DH2 is logic high (H) may be the same. Accordingly, timing margins of the second-first to second-third signals DL2, DM2, and DH2 may be improved.

Figure 6:
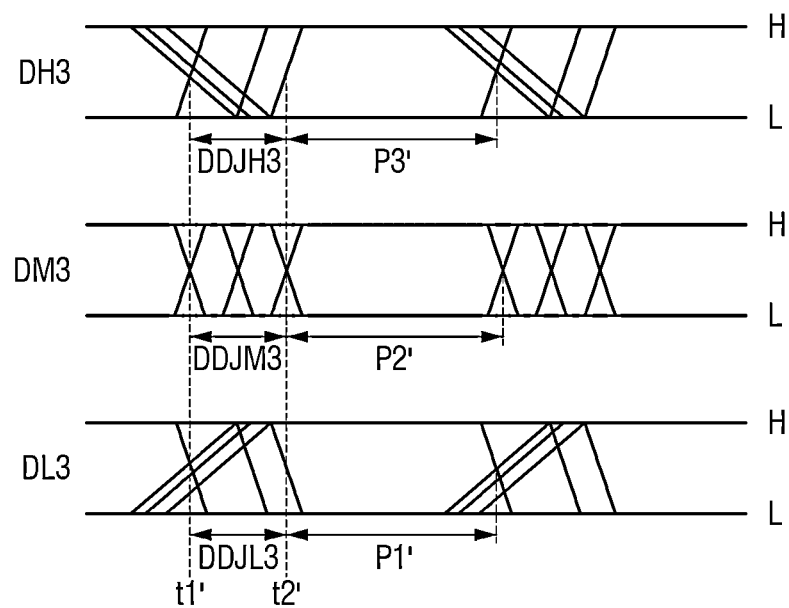
FIG. 6 is a timing diagram of a third signal of FIG. 1.

FIG. 6 is a timing diagram of a third signal of FIG. 1.

Referring to FIGS. 1, 5, and 6, the skew compensation circuit 140 may change a time point at which the second signals DL2, DM2, and DH2 transition from one logic level to another logic level to compensate for the skew between the second signals DL2, DM2, and DH2.

The skew compensation circuit 140 may compensate for, for example, the skew between the second signals DL2, DM2, and DH2 based on the latest time point among the time points at which the second signals DL2, DM2, and DH2 transition from one logic level to another logic level. For example, a transition time point t1 of the second-first signal DL2 may be slower than a transition time point t2 of the second-second signal DM2 and may be the same as a transition time point t3 of the second-third signal DH2. The skew compensation circuit 140 may compensate for the skew between the second signals DL2, DM2, and DH2 based on the first time point t1. This is only an example, and example embodiments of the present inventive concepts are not limited thereto.

Specifically, the first skew compensation circuit S1 may receive the second-first signal DL2 in which the earliest time point at which the logic level is transitioned is t1 to output the third-first signal DL3 in which the earliest time point at which the logic level is transitioned is t1'.

The second skew compensation circuit S2 may receive the second-second signal DM2 in which the earliest time point at which the logic level is transitioned is t2 to output the third-second signal DM3 in which the earliest time point at which the logic level is transitioned is t1'.

The third skew compensation circuit S3 may receive the second-third signal DH2 in which the earliest time point at which the logic level is transitioned is t3 to output the third-third signal DH3 in which the earliest point at which the logic level is transitioned is t1'.

Accordingly, the third signals DL3, DM3, and DH3 in which the skew between the second signals DL2, DM2, and DH2 is compensated may be generated. The logic level of the third signals DL3, DM3, and DH3 may be transitioned at the time point t1'. In addition, the third signals DL3, DM3, and DH3 may have the same data-dependent jitter DDJL3, DDJM3, and DDJH3 having a time between the time point t1' and the time point t2'.

Figures 7, 8:
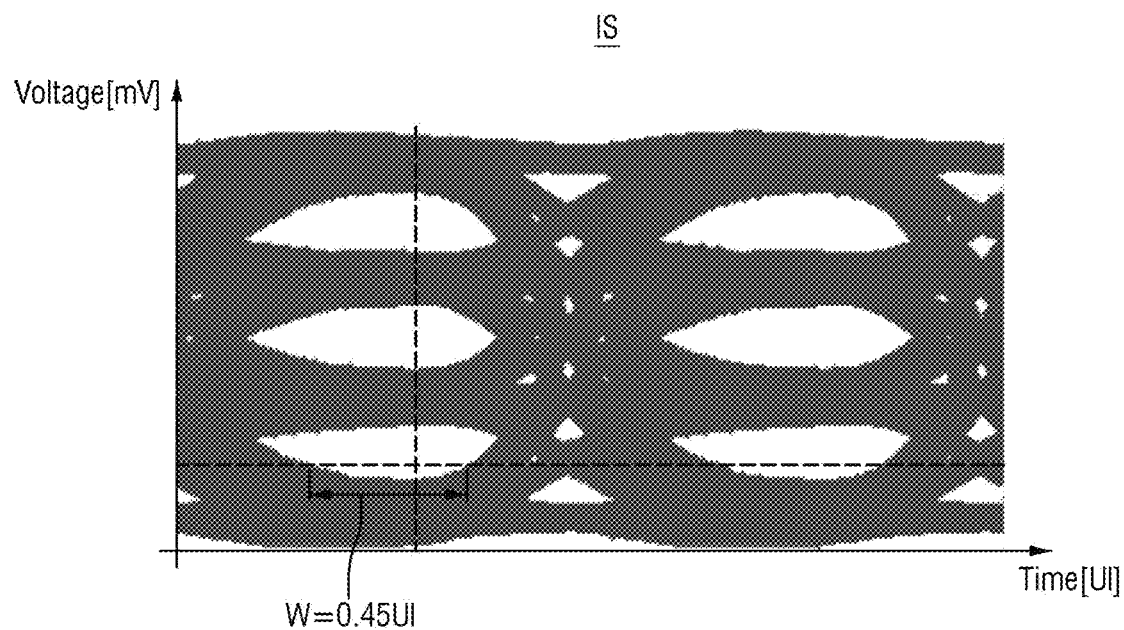
FIG. 7 is a view for describing an operation of a decoder of FIG. 1.
FIG. 8 is an eye-diagram of the input signal of FIG. 1.

FIG. 7 is a view for describing an operation of the decoder of FIG. 1.

The decoder 150 may receive the third signals DL3, DM3, and DH3 and convert the third signals DL3, DM3, and DH3 into the output signal OS. The decoder 150 may generate the output signal OS having the most significant bit MSB and the least significant bit LSB according to the third signals DL3, DM3, and DH3.

For example, when the third-first signal DL3 is '0', the third-second signal DM3 is '0', and the third-third signal DH3 is '0', the output signal OS is '00'. When the third-first signal DL3 is '1', the third-second signal DM3 is '0', and the third-third signal DH3 is '0', the output signal OS is '01'. When the third-first signal DL3 is '1', the third-second signal DM3 is '1', and the third-third signal DH3 is '0', the output signal OS is '10'. When the third-first signal DL3 is '1', the third-second signal DM3 is '1', and the third-third signal DH3 is '1', the output signal OS is '11'.

Figure 9:
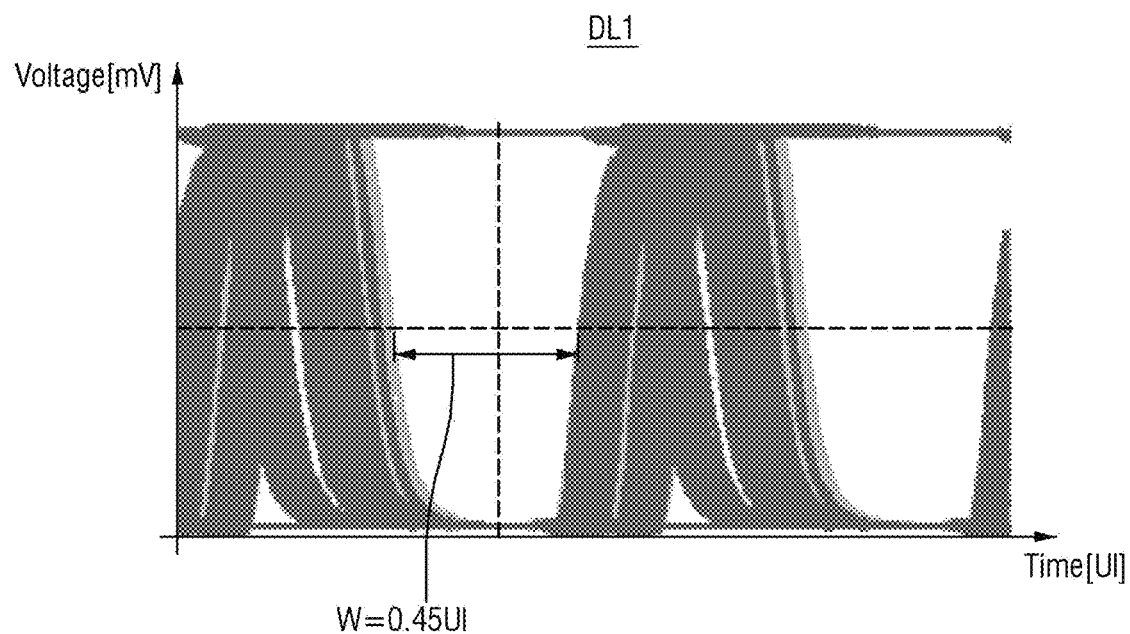
FIG. 9 is an eye-diagram of a first-first signal of FIG. 1.
Figure 10:
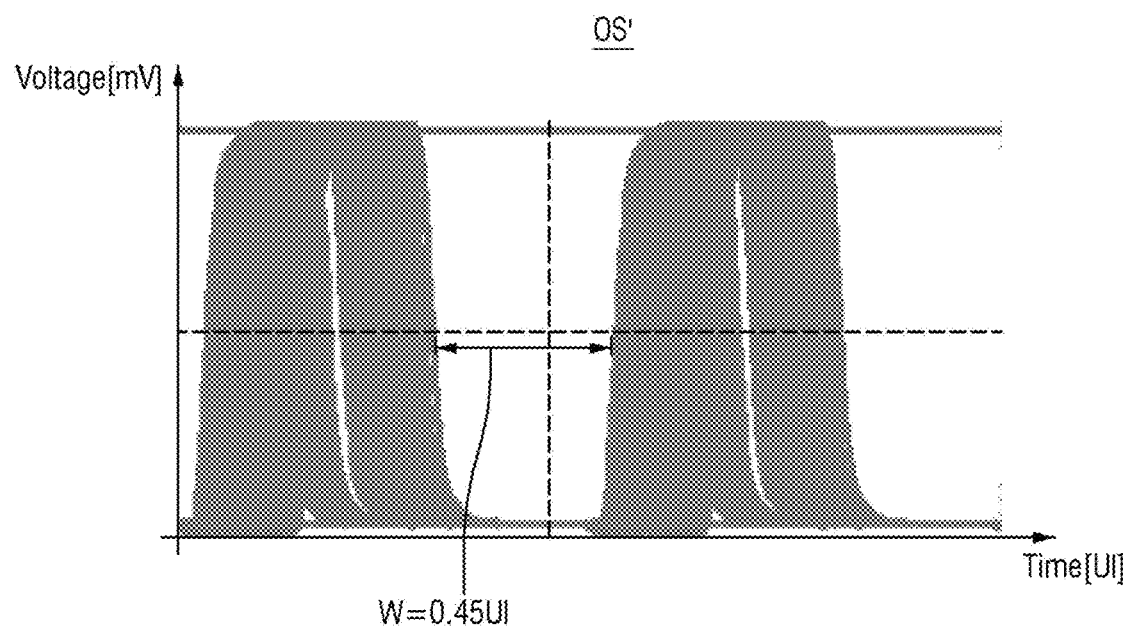
FIG. 10 is an eye-diagram of an output signal in which the first-first signal of FIG. 1 is converted by the decoder.

FIG. 8 is an eye-diagram of the input signal of FIG. 1. FIG. 9 is an eye-diagram of the first-first signal of FIG. 1. FIG. 10 is an eye-diagram of the output signal in which the first-first signal of FIG. 1 is converted by the decoder.

Referring to FIGS. 1 and 8 to 10, an eye width W of the input signal IS is 0.45 UI (Unit Interval). An eye width W of the first-first signal DL1 is 0.45 UI. An eye width W of an output signal OS' is 0.45 UI. That is, when the first-first signal DL1 is converted into the output signal OS' without the jitter compensation circuit 130 and the skew compensation circuit 140, the eye width does not increase.

In the absence of the jitter compensation circuit 130 and the skew compensation circuit 140, the data-dependent jitter (DDJL1 in FIG. 4) of the first-first signal DL1 may be transmitted to the output signal OS. Accordingly, a timing margin may decrease.

Figure 11:
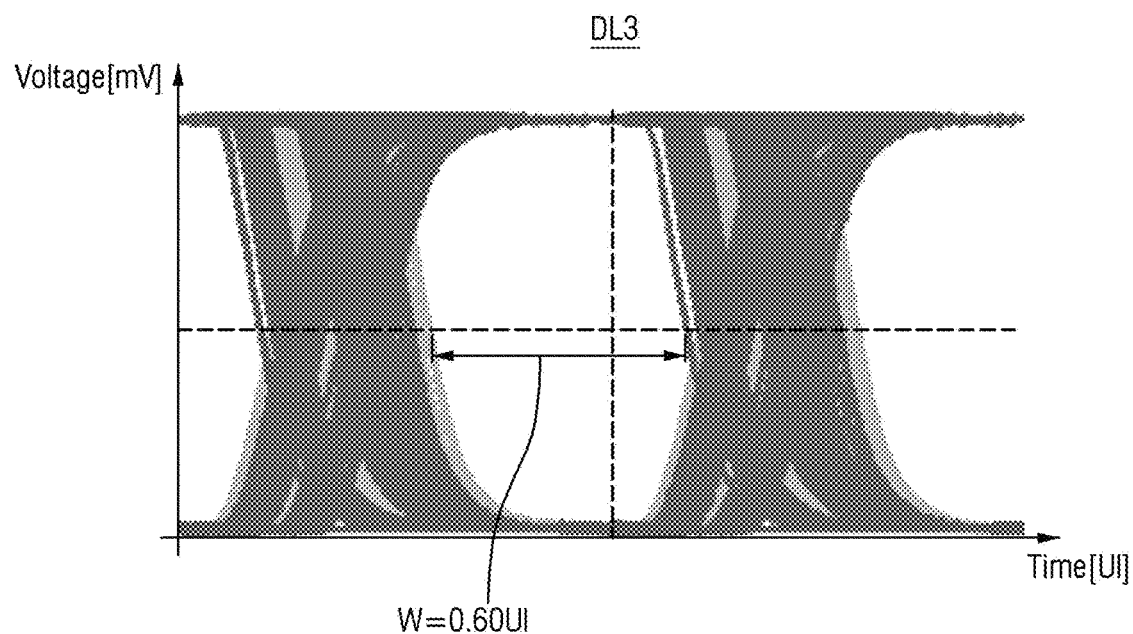
FIG. 11 is an eye-diagram of a third-first signal of FIG. 1.
Figure 12:
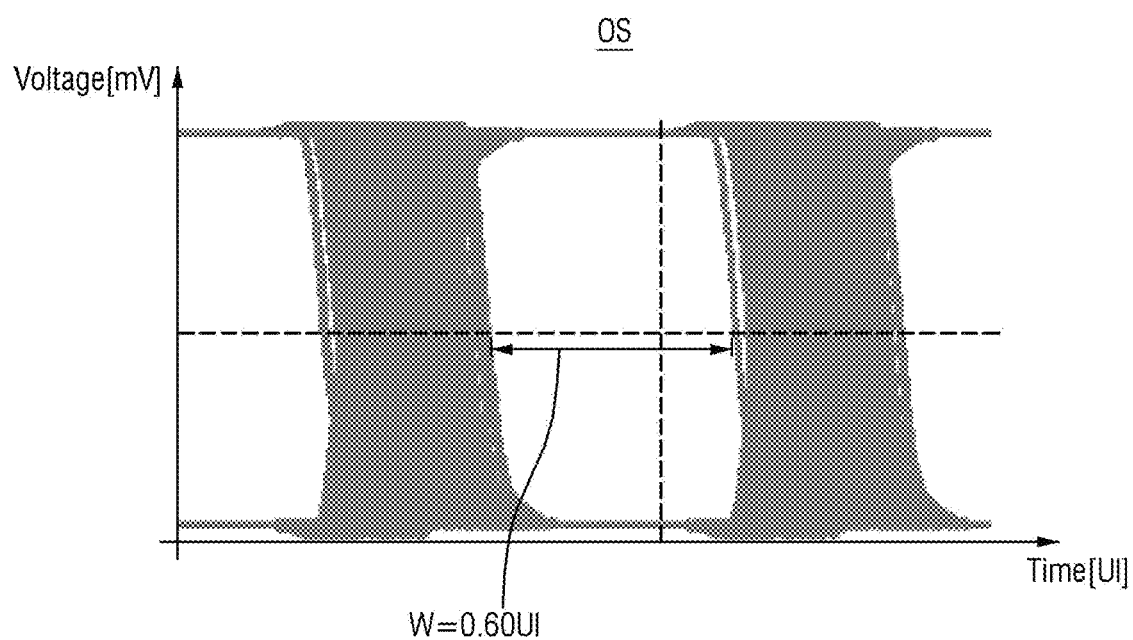
FIG. 12 is an eye-diagram of an output signal in which the third-first signal of FIG. 1 is converted by the decoder.

FIG. 11 is an eye-diagram of the third-first signal of FIG. 1. FIG. 12 is an eye-diagram of an output signal in which the third-first signal of FIG. 1 is converted by the decoder.

Referring to FIGS. 1, 11, and 12, an eye width W of the third-first signal DL3 is 0.60 UI. An eye width W of the output signal OS is 0.60 UI. That is, when the third-first signal DL3 in which the data-dependent jitter and skew are compensated by the jitter compensation circuit 130 and the skew compensation circuit 140 is converted into the output signal OS, the eye width increases.

Therefore, the semiconductor device according to some example embodiments may output an output signal OS having an improved bit error rate (BER) or transmission speed by improving the timing margin.

Figure 13:
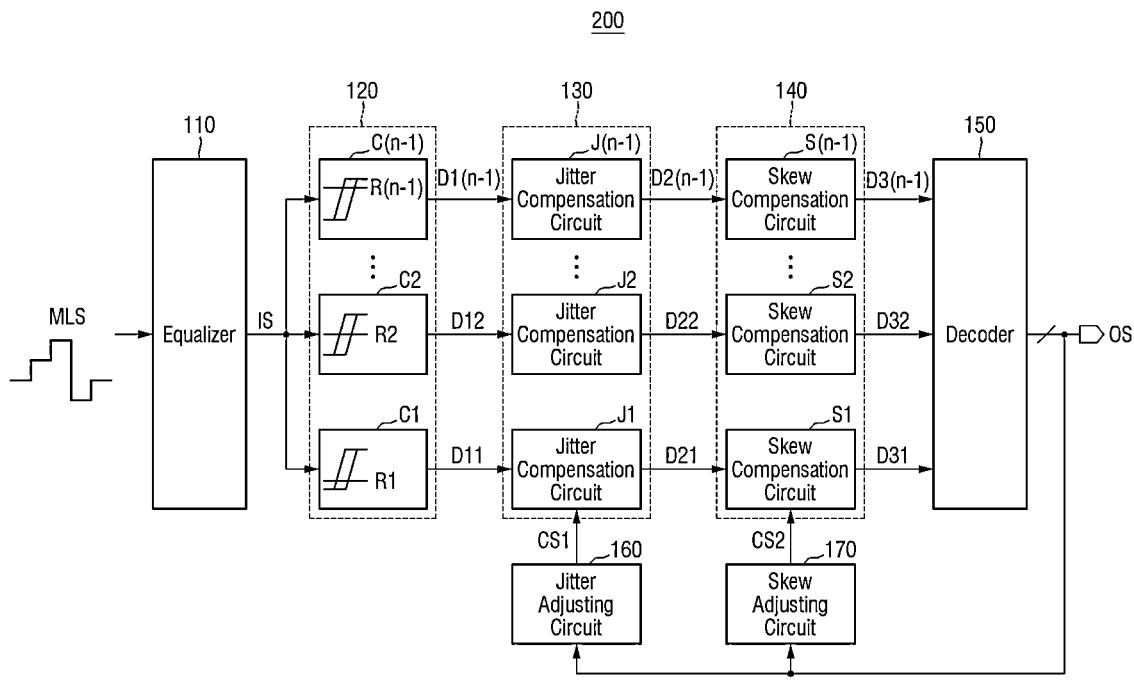
FIG. 13 is a view for describing a semiconductor device according to some example embodiments.
Figure 14:
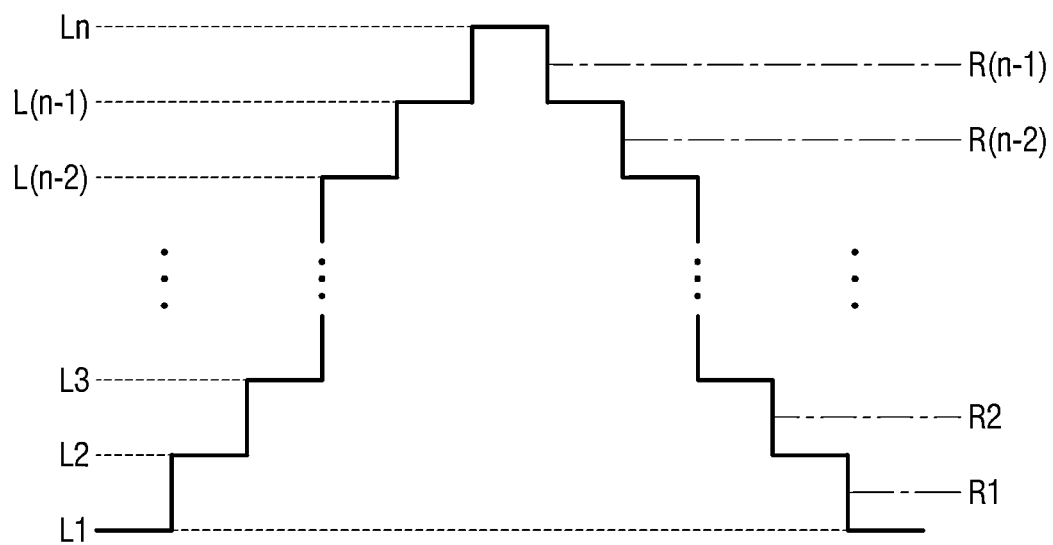
FIG. 14 is a view for describing an input signal of FIG. 13.

FIG. 13 is a view for describing a semiconductor device according to some example embodiments. FIG. 14 is a view for describing the input signal of FIG. 13. For convenience of description, points different from those described with reference to FIGS. 1 to 12 will be mainly described.

Referring to FIG. 13, a semiconductor device 200 according to some example embodiments may include an equalizer 110, a comparison circuit 120, a jitter compensation circuit 130, a skew compensation circuit 140, and a decoder 150.

The comparison circuit 120 may receive an input signal IS having n (n is a natural number equal to or greater than 3) signal levels and convert the received input signal IS having n signal levels into n−1 first signals D11 to D1(n−1) having two signal levels. The comparison circuit 120 may compare the input signal IS with n−1 reference signals R1 to R(n−1) to output n−1 first signals D11 to D1(n−1), respectively.

The comparison circuit 120 may include first to n−1th comparators C1 to C(n−1). The first to n−1th comparators C1 to C(n−1) may compare the input signal IS with first to n−1th reference signals R1 to R(n−1) to output first-first to first-(n−1)th signals D11 to D1(n−1) respectively.

Specifically, referring to FIG. 14, the input signal IS may have the n signal levels. The input signal IS may have first to nth signal levels L1 to Ln. A magnitude of each of the first to n−1th reference signals R1 to R(n−1) may be a value between two continuous signal levels of the input signal IS. For example, the magnitude of the n−1th reference signal R(n−1) may be defined as a value between the n−1th signal level L(n−1) and the nth signal level Ln.

Referring again to FIG. 13, the jitter compensation circuit 130 may receive the first-first to first-(n−1) signals D11 to D1(n−1) and compensate for jitter between the first-first to first-(n−1) signals D11 to D1(n−1) according to a first control signal CS1 to output second-first to second-(n−1) signals D21 to D2(n−1).

The jitter compensation circuit 130 may include first to n−1th jitter compensation circuits J1 to J(n−1). The first to n−1th jitter compensation circuits J1 to J(n−1) may compensate for lengths of periods in which the first to n−1th comparison signals D1 to D1(n−1) transition from logic high to logic low or transition from logic low to logic high according to the first control signal CS1 to output the first to n−1th jitter compensation signals D21 to D2(n−1) or the first to n−1th comparison signals D11 to D1(n−1) as the first to n−1th jitter compensation signals D21 to D2(n−1), respectively.

The skew compensation circuit 140 may receive the first to n−1th jitter compensation signals D21 to D2(n−1) and compensate for a timing skew between the first to n−1th jitter compensation signals D21 to D2(n−1) according to a second control signal CS2 to output first to n−1th skew compensation signals D31 to D3(n−1).

The skew compensation circuit 140 may include first to n−1th skew compensation circuits S1 to S(n−1). The first to n−1th skew compensation circuits S1 to S(n−1) may output the first to n−1th skew compensation signals D31 to D3(n−1) according to the second control signal CS2, respectively.

The decoder 150 may convert the first to n−1th skew compensation signals D31 to D3(n−1) into the output signal OS. The output signal OS may be m (m is a natural number equal to or greater than 2) bits.

Figure 15:
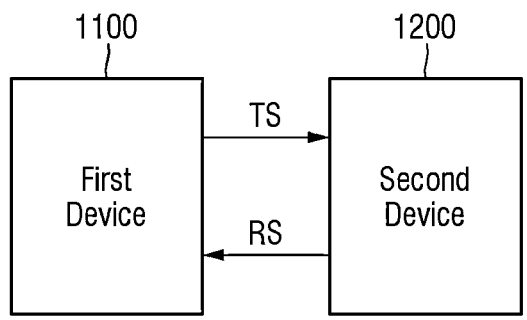
FIG. 15 is a view for describing an electronic device according to some example embodiments.

FIG. 15 is a view for describing an electronic device according to some example embodiments.

Referring to FIG. 15, an electronic device 1000 according to some example embodiments may include a first device 1100 and a second device 1200. The first device 1100 and the second device 1200 may communicate with each other through a channel CH. For example, each of the first device 1100 and the second device 1200 may be a portable communication terminal, a personal digital assistant (PDA), a portable media player (PMP), a smart phone, a wearable device, or a computing device such as a personal computer, a server, a workstation, a laptop, or the like. Alternatively, each of the first device 1100 and the second device 1200 may be one of various functional blocks (e.g., intellectual property (IP) blocks) included in the same semiconductor chip or different semiconductor chips.

The channel CH may be a signal line (i.e., a wired communication channel) or a wireless communication channel that electrically connects the first device 1100 and the second device 1200, which may include transmit signals TS and receive signals RS. Each of the first device 1100 and the second device 1200 may transmit and receive various types of signals such as an electrical signal, an optical signal, and a wireless signal. For example, the first device 1100 and the second device 1200 may operate based on an electrical signal.

For example, the first device 1100 and the second device 1200 may transmit and receive data based on four-level pulse amplitude modulation. As described with reference to FIG. 2, the first device 1100 and the second device 1200 may transmit and receive multi-level signals MLS having four signal levels L1, L2, L3, and L4. The first device 1100 and the second device 1200 may include the semiconductor device 100 of FIG. 1.

For example, the first device 1100 and the second device 1200 may transmit and receive data based on, for example, n-level pulse amplitude modulation (PAM-n). As described with reference to FIG. 14, the first device 1100 and the second device 1200 may transmit and receive multi-level signals MLS having n signal levels L1 to Ln. The first device 1100 and the second device 1200 may include the semiconductor device 200 of FIG. 13.

Figure 16:
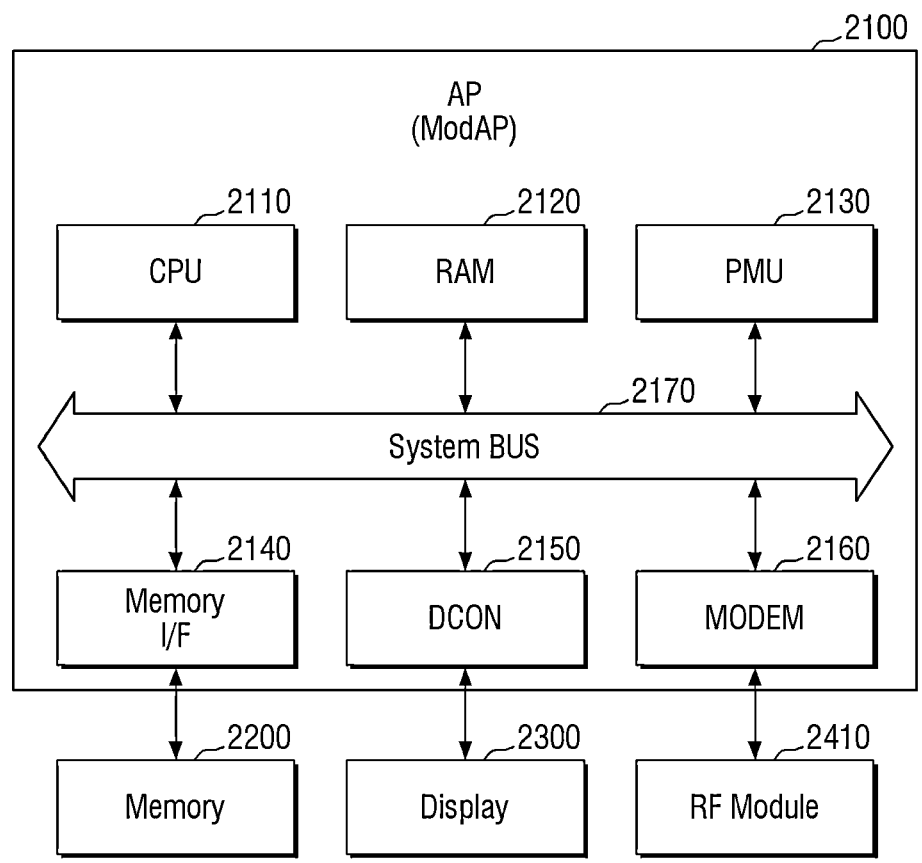
FIG. 16 is a view for describing a mobile terminal according to some example embodiments.

FIG. 16 is a view for describing a mobile terminal according to some example embodiments.

Referring to FIG. 16, a mobile terminal 2000 according to some example embodiments may include an application processor 2100, a memory 2200, a display 2300, and an RF module 2410. In addition, the mobile terminal 2000 may further include various components such as a lens, a sensor, and an audio module.

The application processor 2100 may be implemented as a system on a chip (SoC) and may include a CPU 2110, a RAM 2120, a power management unit (PMU) 2130, a memory interface 2140, a display controller 2150, a modem 2160, and a bus 2170. The application processor 2100 may further include various IPs. The application processor 2100 may be referred to as ModAP as a function of a modem chip is integrated therein.

The CPU 2110 may control overall operations of the application processor 2100 and the mobile terminal 2000. The CPU 2110 may control an operation of each component of the application processor 2100. Also, the CPU 2110 may be implemented as a multi-core. The multi-core is one computing component with two or more independent cores.

The RAM 2120 may temporarily store programs, data, or instructions. For example, the programs and/or data stored in the memory 2200 may be temporarily stored in the RAM 2120 according to the control of the CPU 2110 or a booting code. The RAM 2120 may be implemented as a DRAM or a SRAM.

The PMU 2130 may manage power of each component of the application processor 2100. The PMU 2130 may also determine an operation state of each component of the application processor 2100 and control the operation.

The memory interface 2140 may control an overall operation of the memory 2200 and may control data exchange between each component of the application processor 2100 and the memory 2200. The memory interface 2140 may write data to or read data from the memory 2200 in response to a request from the CPU 2110.

The display controller 2150 may transmit image data to be displayed on the display 2300 to the display 2300. The display 2300 may be implemented as a flat panel display such as a liquid crystal display (LCD), an organic light emitting diode (OLED) display, etc. or a flexible display.

For wireless communication, the modem 2160 may modulate data to be transmitted to suit a wireless environment and recover the received data. The modem 2160 may perform digital communication with the RF module 2410.

The modem 2160 may include the semiconductor device 100 described with reference to FIGS. 1 to 12 or the semiconductor device 200 described with reference to FIGS. 13 and 14.

The RF module 2410 may convert a high frequency signal received through an antenna into a low frequency signal and transmit the converted low frequency signal to the modem 2160. Also, the RF module 2410 may convert the low frequency signal received from the modem 2160 into a high frequency signal and transmit the converted high frequency signal to the outside of the mobile terminal 2000 through the antenna. Also, the RF module 2410 may amplify or filter a signal.

The RF module 2410 may include the semiconductor device 100 described with reference to FIGS. 1 to 12 or the semiconductor device 200 described with reference to FIGS. 13 and 14.

One or more of the elements disclosed above may include or be implemented in one or more processing circuitries such as hardware including logic circuits; a hardware/software combination such as a processor executing software; or a combination thereof. For example, the processing circuitries more specifically may include, but is not limited to, a central processing unit (CPU), an arithmetic logic unit (ALU), a digital signal processor, a microcomputer, a field programmable gate array (FGPA), a System-on-Chip (SoC), a programmable logic unit, a microprocessor, application-specific integrated circuit (ASIC), etc.

Although example embodiments of the present inventive concepts have been described above with reference to the accompanying drawings, the present inventive concepts are not limited to the example embodiments but may be manufactured in various different forms, and it will be understood that the present inventive concepts may be performed in other specific forms without changing the scope of the present inventive concepts. Therefore, it should be understood that the embodiments described above are illustrative in all respects and not restrictive.

What is claimed is:

1. A semiconductor device comprising:
   a comparison circuit configured to receive an input signal having n signal levels, where n is a natural number equal to or greater than three, and output n−1 first signals having two signal levels; and
   a jitter compensation circuit configured to receive the n−1 first signals and compensate for at least one of a length of a period in which a signal level of at least one of the n−1 first signals transitions from a first signal level to a second signal level different from the first signal level, and a length of a period in which the signal level of the at least one of the n−1 first signals transitions from the second signal level to the first signal level, to output n−1 second signals.

2. The semiconductor device of claim 1, wherein the jitter compensation circuit includes n−1 jitter compensation circuits.

3. The semiconductor device of claim 1, wherein the n−1 first signals include a first-first signal and a first-second signal, and
   the jitter compensation circuit includes:
   a first jitter compensation circuit configured to compensate for a length of a period in which a signal level of the first-first signal transitions from the first signal level to the second signal level; and
   a second jitter compensation circuit configured to compensate for a length of a period in which a signal level of the first-second signal transitions from the second signal level to the first signal level.

4. The semiconductor device of claim 3, wherein the first jitter compensation circuit is not configured to compensate for a length of a period in which the signal level of the first-first signal transitions from the second signal level to the first signal level, and
   the second jitter compensation circuit is not configured to compensate for a length of a period in which the signal level of the first-second signal transitions from the first signal level to the second signal level.

5. The semiconductor device of claim 4, wherein the length of the period in which the signal level of the first-first signal transitions from the first signal level to the second signal level is greater than the length of the period in which the signal level of the first-first signal transitions from the second signal level to the first signal level, and
   the length of the period in which the signal level of the first-second signal transitions from the second signal level to the first signal level is greater than the length of the period in which the signal level of the first-second signal transitions from the first signal level to the second signal level.

6. The semiconductor device of claim 3, wherein the n−1 first signals further include a first-third signal, and
   the jitter compensation circuit further includes a third jitter compensation circuit configured to output the first-third signal as the second signal.

7. The semiconductor device of claim 3, wherein the length of the period in which the signal level of the first-first signal transitions from the first signal level to the second signal level is the same as the length of the period in which the signal level of the first-second signal transitions from the second signal level to the first signal level.

8. The semiconductor device of claim 3, wherein the comparison circuit includes a first comparator configured to generate the first-first signal using a first reference signal and a second comparator configured to generate the first-second signal using a second reference signal,
   a signal level of the second reference signal is higher than a signal level of the first reference signal, and
   the first signal level is a logic high level, and the second signal level is a logic low level.

9. The semiconductor device of claim 1, further comprising a skew compensation circuit configured to compensate for a timing skew between the n−1 second signals to output n−1 third signals.

10. The semiconductor device of claim 9, wherein the skew compensation circuit includes n−1 skew compensation circuits.

11. The semiconductor device of claim 1, wherein the comparison circuit is configured to generate the n−1 first signals using n−1 reference signals.

12. The semiconductor device of claim 11, wherein the comparison circuit includes a comparator configured to compare the n−1 reference signals with the input signal.

13. The semiconductor device of claim 12, wherein the comparator includes n−1 comparators.

14. A semiconductor device comprising:
   a comparison circuit configured to receive an input signal having n signal levels, where n is a natural number equal to or greater than three, and output n−1 first signals having two signal levels;
   a jitter compensation circuit configured to receive the n−1 first signals and compensate for at least one of a length of a period in which a signal level of at least one of the n−1 first signals is a first signal level, and a length of a period in which the signal level of the at least one of the n−1 first signals is a second signal level different from the first signal level, to output n−1 second signals; and
   a skew compensation circuit configured to receive the n−1 second signals and compensate for a timing skew between the n−1 second signals to output n−1 third signals.

15. The semiconductor device of claim 14, wherein the n−1 first signals include a first-first signal and a first-second signal, the n−1 second signals include a second-first signal and a second-second signal, and the jitter compensation circuit includes:

a first jitter compensation circuit configured to compensate for a length of a period in which a signal level of the first-first signal is the first signal level to generate the second-first signal; and a second jitter compensation circuit configured to compensate for a length of a period in which a signal level of the first-second signal is the second signal level to generate the second-second signal.

16. The semiconductor device of claim 15, wherein the comparison circuit includes a first comparator configured to generate the first-first signal using a first reference signal and a second comparator configured to generate the first-second signal using a second reference signal, a signal level of the second reference signal is higher than a signal level of the first reference signal, and the first signal level is a logic high level, and the second signal level is a logic low level.

17. The semiconductor device of claim 16, wherein the n−1 first signals further include a first-third signal, the comparison circuit further includes a third comparator configured to generate the first-third signal using a third reference signal, a signal level of the third reference signal is lower than the signal level of the second reference signal and higher than the signal level of the first reference signal, and a length of a period in which the signal level of the first-third signal is the first signal level is greater than the length of the period in which the signal level of the first-first signal is the first signal level and the length of the period in which the signal level of the first-second signal is the second signal level.

18. The semiconductor device of claim 15, wherein a length of a period in which a signal level of the second-first signal is the first signal level is the same as a length of a period in which a signal level of the second-second signal is the second signal level.

19. A semiconductor device comprising:

a comparison circuit configured to receive an input signal having n signal levels, where n is a natural number equal to or greater than three, and output first to n−1th comparison signals having two signal levels;

a jitter compensation circuit configured to compensate for at least one of a length of a period in which a signal level of at least one of the first to n−1th comparison signals transitions from a first signal level to a second signal level different from the first signal level, and a length of a period in which the signal level of the at least one of the first to n−1th comparison signals transitions from the second signal level to the first signal level, to output first to n−1th jitter compensation signals;

a skew compensation circuit configured to compensate for a timing skew between the first to n−1th jitter compensation signals to output first to n−1th skew compensation signals; and a decoder configured to convert the first to n−1th skew compensation signals into an output signal.

20. The semiconductor device of claim 19, wherein the comparison circuit includes first to n−1th comparators configured to compare first to n−1th reference signals with the input signal to output the first to n−1th comparison signals, respectively, the jitter compensation circuit includes first to n−1th jitter compensation circuits configured to output the first to n−1th jitter compensation signals, respectively, and the skew compensation circuit includes first to n−1th skew compensation circuits configured to output the first to n−1th skew compensation signals, respectively.

* * * * *